United States Patent [19]

Cavanaugh

[11] 4,146,191
[45] Mar. 27, 1979

[54] MICROPHONE RETRIEVER

[75] Inventor: Charles W. Cavanaugh, Bassfield, Miss.

[73] Assignee: Industrial Safety Devices, Inc., Prentiss, Miss.

[21] Appl. No.: 714,273

[22] Filed: Aug. 13, 1976

[51] Int. Cl.² .................... B65H 75/48; H04M 1/04
[52] U.S. Cl. .................... 242/107; 179/155
[58] Field of Search .................... 242/107–107.7, 242/106; 191/12.2 R, 12.4; 179/155

[56] References Cited

U.S. PATENT DOCUMENTS

| | | | |
|---|---|---|---|
| 1,139,554 | 5/1915 | MacLean | 179/155 X |
| 1,163,444 | 12/1915 | Newell | 191/12.2 R X |
| 1,580,220 | 4/1926 | Schwarze | 179/155 |
| 1,748,283 | 2/1930 | Filby | 242/107.6 |
| 2,526,256 | 10/1950 | Mihara | 242/107.6 |
| 2,713,407 | 7/1955 | Miller | 242/107.2 X |
| 3,322,372 | 5/1967 | Hellstrom | 242/107 |
| 3,323,748 | 6/1967 | Cavedo | 242/107.2 |
| 3,373,954 | 3/1968 | Hilsinger | 242/107 |
| 3,698,656 | 10/1972 | Ballenger | 242/106 |
| 3,854,017 | 12/1974 | Crim | 191/12.2 R |
| 3,895,764 | 7/1975 | Roland | 242/107.6 |

FOREIGN PATENT DOCUMENTS

| | | | |
|---|---|---|---|
| 430328 | 4/1924 | Fed. Rep. of Germany | 179/155 |
| 291060 | 3/1953 | Italy | 179/155 |
| 362421 | 5/1930 | United Kingdom | 179/155 |

Primary Examiner—Harvey C. Hornsby
Assistant Examiner—John M. Jillions
Attorney, Agent, or Firm—Spencer & Kaye

[57] ABSTRACT

An automatic microphone retriever arranged to be detachably mounted on a fixed microphone holding element and including a member arranged to hold a microphone and connected by a flexible cord to a spring-loaded reel rotatably mounted within the retriever to enable the microphone, while attached to the member, to be pulled away from the retriever by a force sufficient to rotate the reel against its spring loading and to enable the microphone and its holding member to be drawn back to the retriever by the force applied to the reel by its spring loading when the external withdrawal force exerted on the microphone is reduced.

11 Claims, 2 Drawing Figures

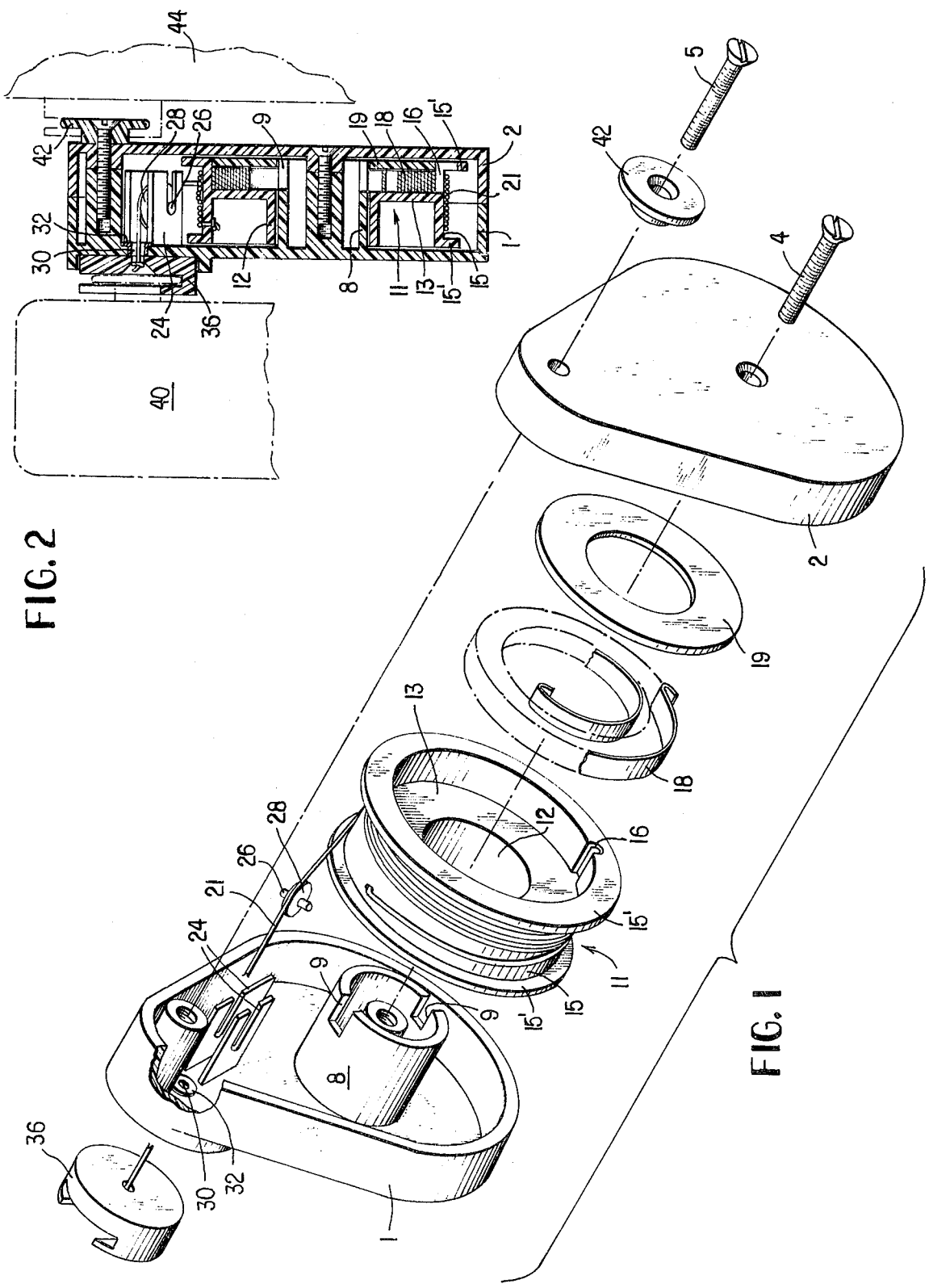

MICROPHONE RETRIEVER

BACKGROUND OF THE INVENTION

The present invention relates to a microphone retriever capable of being mounted between a stationary microphone holder and a microphone of the hand-held type and arranged to return the microphone to a predetermined storage position after completion of a communication.

It has long been a common practice for aircraft to be equipped with two-way communication equipment which, in smaller aircraft, is used by the pilot. In addition, the installation of two-way communication equipment in ground vehicles is becoming ever more common. Such equipment has long been used in the cabs of tractor-trailers and in taxis. More recently, the use of CB equipment in private automobiles has been increasing at a substantial rate.

Most two-way communication equipment used in vehicles includes a hand-held microphone for voice transmission. In order to transmit, the user of the equipment must take the microphone from a holder mounted on the radio housing or on the vehicle dashboard, and upon completion of transmission the microphone must be placed back onto the holder.

Whenever the user of the two-way communication equipment is also guiding the vehicle, the action of returning the microphone to its holder while the vehicle is in motion will constitute a distraction that prevents the user from paying full attention to control of the vehicle, thereby increasing the possibility of an accident. In view of the significant rate at which the number of CB units in private automobiles is increasing, and the practice of users of this equipment to conduct conversations while driving at high speeds on crowded highways, as well as within congested urban areas, it will be readily appreciated that the possibilities of accidents resulting directly from such distraction of the driver constitute a problem of increasing seriousness.

SUMMARY OF THE INVENTION

It is therefore a primary object of the invention to reduce the amount of attention which the driver or pilot of a vehicle must devote to his two-way communication equipment while simultaneously guiding his vehicle.

A more specific object of the invention is to permit such an individual to devote full attention to guiding the vehicle while returning the hand-held microphone of such equipment to its storage position.

A further specific object of the invention is to enable such microphone to be automatically returned precisely to its predetermined storage position subsequent to use.

These and other objects according to the invention are achieved by a microphone retriever for holding the hand-held microphone of a two-way voice communication apparatus installed in a vehicle, which retriever includes: a housing provided with an opening and with means for detachably securing the housing to a surface within the vehicle, microphone attachment means disposed outside of, and movable relative to, the housing and arranged to be detachably secured to such microphone, a flexible microphone retrieving cord extending through the opening in the housing and having one end secured to the microphone attachment means, and cord retracting and guide means located within the housing and having the other end of the cord secured thereto for permitting the cord to be pulled from the housing while applying to the cord a retracting force in a direction to urge the cord into the housing in order to bring the microphone attachment means into a predetermined rest position against the housing.

In a preferred embodiment of the invention, the housing is composed of two halves each constituted by a molded plastic component, the cord retracting and guide means include a molded plastic reel mounted within the housing and a flat spiral spring connected between the housing and the reel, as well as a pulley, which can also be of molded plastic, disposed for guiding the cord between the reel and the housing opening. Preferably, the spiral spring is disposed in a circular recess formed in the reel and is connected at one end to a reel support integral with one part of the housing and rotatably supporting the reel. Preferably, the housing opening is furnished with a brass eyelet presenting a low friction passage for the cord.

BRIEF DESCRIPTION OF THE DRAWING

FIG. 1 is an exploded, perspective view of one preferred embodiment of a microphone retriever according to the invention.

FIG. 2 is a side, elevational, cross-sectional view of the embodiment of FIG. 1 in its assembled state, the plane of FIG. 2 being substantially along a plane of bilateral symmetry of the device and the mounting of the device between an existing microphone bracket and a microphone being depicted.

DESCRIPTION OF THE PREFERRED EMBODIMENTS

The retriever shown in FIGS. 1 and 2 includes a housing composed of a front housing half 1 and a rear housing half 2 which can be joined together by screws 4 and 5 passing through openings in housing half 2 and engaging in threaded openings located in projections extending from the interior of housing half 1.

Fastened to the interior of one of the housing halves, in this case front half 1, is a post unit 8 formed to have one or more slots 9 in its free axial end. Fitted onto post unit 8 is a reel 11 having a hub portion 12 bearing on unit 8, an annular, disc-shaped connecting web 13 and an outer cylindrical wall 15 having a radially outwardly extending rim, or flange, 15' at one or both axial extremities. Hub portion 12 and wall 15 are connected together by web 13.

Outer cylindrical wall 15 is provided with at least one axial slot 16 located at the side of web 13 remote from post 8, while web 13 and the portion of wall 15 remote from post 8 define a circular recess receiving a flat spiral spring 18. Each end of spring 18 is bent over to present a hook, the hook at the inner end engaging in a slot 9 in post 8 and the hook at the outer end engaging in a slot 16 in outer wall 15. The recess containing spring 18 is closed by a removable, annular cover disc 19 press-fitted into the axial end of the recess.

Spring 18 is oriented to oppose rotation of reel 11 in a counterclockwise direction, with respect to the view of FIG. 1, so that when the reel 11 is rotated in that direction, spring 18 becomes coiled and provides a restoring force. When the force rotating the reel in the counterclockwise direction is released, spring 18 will rotate the reel back in the clockwise direction to its initial position.

A flexible cord 21, which can be of any suitable type, such as a plastic coated nylon cord, is wrapped around the outer surface of wall 15. The inner end of cord 21 is fastened to wall 15 in any suitable manner. In the illustrated embodiment, this cord end is inserted through a small hole in wall 15 and knotted at the other side of the hole, in the region enclosed by wall 15, as is clearly shown in FIG. 2.

Front housing half 1 carries a pair of parallel projections 24 directed toward the interior of the housing and located adjacent the location of reel 11. Each projection is provided with an elongated recess extending from its free end and the two recesses constitute bearings for the axle 26 of a pulley wheel 28.

Front housing half 1 is further provided with an opening 30 into which is inserted a brass eyelet 32. The outer end of cord 21 passes around pulley wheel 28 and then out of the housing, through eyelet 32, and is secured to a member 36 by being passed through an opening provided in the member and then being knotted as can be seen in FIG. 2.

Member 36 is provided with a suitable recess to define a microphone holding bracket. This member is attached to a hand-held microphone 40, as shown in FIG. 2, by insertion of a bracket-engaging member carried by the microphone, and presenting an annular flange, in the bracket defined by member 36.

Cord 21 is wound around reel 11 in a direction such that withdrawal of microphone 40 and member 36 from the housing will rotate reel 11 in the counterclockwise direction, thereby coiling spring 18. Upon subsequent release or reduction of the external withdrawal force on the microphone, spring 18 will rotate reel 11 clockwise, so that cord 21 is pulled back into the retriever and wound onto reel 11. As a result, the member 36 and its attached microphone are returned to their predetermined rest position, member 36 then engaging in a shallow receiving recess formed in the outer surface of housing half 1.

To assemble the unit, cord 21 is wrapped around wall 15 and the inner cord end is secured to the wall in the manner described above. Spring 18 is then inserted into the recess defined by web 13 and the portion of wall 15 remote from post 8 and the hook at the outer end of spring 18 is inserted into slot 16 to engage the portion of wall 15 adjacent the slot. Reel 11 is then placed on post 8 and the hook on the inner end of spring 18 introduced into one of the slots 9 to engage a portion of the wall of the post adjacent that slot.

The outer end of cord 21 is then passed around pulley 28, through eyelet 22 and through the opening in member 36. The outer end of the cord is then connected to member 36 as by being knotted. As can be seen in FIG. 2, the cord-receiving opening in member 36 is suitably countersunk to prevent the knot at the outer cord end from interfering with attachment of microphone 40 to member 36.

Finally, the housing is closed and the housing halves secured together by screws 4 and 5. The retriever is completed by a member 42 formed to constitute a bracket-engaging member and provided to be engaged in a microphone bracket attached to the housing 44 of the communication equipment. Member 42 is rigidly secured to rear housing half 2, for example by means of screw 5, and this secures the retriever housing to the communication equipment. Of course, the bracket for holding the retriever could be mounted at some other location in the vehicle, as on an instrument panel or dashboard.

All of the components of the retriever according to the invention can be molded elements made of suitable impact-resistant, high strength plastic, with the exception, of course, of brass eyelet 32, axle 26 and spring 18, which are preferably of steel, screws 4 and 5 and cord 21. The selection of the particular plastic would be well within the competence of one skilled in the art and forms no part of the present invention.

The brass eyelet 32 is provided to reduce frictional resistance to movement of cord 21 and, to further reduce friction, the region within the housing adjacent eyelet 32 could be packed with silicone grease.

While reel 11 is shown to have two flanges 15', one of these flanges, preferably the one facing front housing half 1, could be eliminated to facilitate the molding of reel 11.

It will be understood that the above description of the present invention is susceptible to various modifications, changes and adaptations, and the same are intended to be comprehended within the meaning and range of equivalents of the appended claims.

What is claimed is:

1. A microphone retriever for holding the hand-held microphone of a two-way voice communication apparatus installed in a vehicle, said retriever comprising, in combination:
    a housing provided with an opening and with means for detachably securing said housing to a surface within the vehicle;
    microphone attachment means disposed outside of, and movable relative to, said housing and constituted by a body provided at one side with a recess defining a microphone holding bracket via which said attachment means is arranged to be detachably secured to such microphone, said microphone attachment means being further provided with a cord receiving opening communicating with said recess and provided with an enlarged region adjacent said recess for permitting one end of a cord to be secured to said attachment means without extending into said recess;
    a flexible microphone retrieving cord extending through the opening in said housing and having one end received in said cord receiving opening and secured to said microphone attachment means without extending into said recess; and
    cord retracting and guide means located within said housing and having the other end of said cord secured thereto for permitting said cord to be pulled from said housing while applying to said cord a retracting force in a direction to urge said cord into said housing in order to bring said microphone attachment means into a predetermined rest position against said housing.

2. An arrangement as defined in claim 1 wherein said cord retracting and guide means comprise a reel mounted for rotation in said housing and to which said other end of said cord is secured, and spring means connected between said reel and said housing for providing a restoring force to rotate said reel in a direction to wind said cord thereon.

3. An arrangement as defined in claim 2 wherein said spring means comprise a flat spiral spring.

4. An arrangement as defined in claim 3 wherein said reel defines a circular recess extending axially from one axial end surface thereof and said spring is held in said recess.

5. An arrangement as defined in claim 4 further comprising a cover disc closing the outer end of said recess for maintaining said spring in place.

6. An arrangement as defined in claim 2 wherein said cord retracting and guide means comprise a pulley wheel rotatably mounted in said housing and positioned for guiding the cord between said reel and said opening in said housing, and said reel is oriented to rotate about an axis parallel to the direction of travel of said cord between said pulley wheel and said opening.

7. An arrangement as defined in claim 2 wherein said housing is constituted by two housing halves of molded plastic and said reel and said microphone attachment means are each constituted by a molded plastic member.

8. An arrangement as defined in claim 2 wherein said housing comprises a reel support member integral with one portion of said housing and located within said housing, and said reel is rotatably mounted on said reel support member, and said spring means is a flat spiral spring having one end secured to said reel and its other end secured to said reel support member.

9. An arrangement as defined in claim 1 further comprising a brass eyelet mounted in said opening of said housing and presenting a passage for said cord.

10. An arrangement as defined in claim 1 wherein said means for detachably securing said housing comprises a bracket-engaging member having a configuration which bears a mating relationship to said recess defining a microphone holding bracket.

11. An arrangement as defined in claim 1 wherein said housing comprises means defining a receiving recess located at the outer surface of said housing in the region of said housing opening for receiving said microphone attachment means and retaining said microphone attachment means in its said predetermined rest position under the influence of the retracting force applied to said cord.

* * * * *